United States Patent [19]

Dwinell

[11] 4,263,954
[45] Apr. 28, 1981

[54] TIRE CHAIN HAVING IMPROVED TRACTION

[75] Inventor: James M. Dwinell, Morrisville, Vt.

[73] Assignee: Burns Bros., Inc., Portland, Oreg.

[21] Appl. No.: 71,495

[22] Filed: Aug. 31, 1979

[51] Int. Cl.³ .............................................. B60C 27/08
[52] U.S. Cl. ................................. 152/222; 24/73 AC; 24/73 CE; 24/265 H; 152/239; 152/240; 152/243; 301/41 R; 301/42
[58] Field of Search ............... 152/221, 222, 239, 240, 152/243; 301/41 R, 42; 59/78; 267/73, 74; 24/68 TT, 73 AC, 73 CE, 265 H

[56] References Cited

U.S. PATENT DOCUMENTS

| | | | |
|---|---|---|---|
| 1,267,544 | 5/1918 | Haubner | 152/221 X |
| 1,273,930 | 7/1918 | Scherer et al. | 152/222 |
| 1,297,155 | 3/1919 | Harrington | 152/221 |
| 1,311,971 | 8/1919 | Johnson | 152/222 |
| 1,324,069 | 12/1919 | Salembier | 152/232 |
| 1,350,484 | 8/1920 | Bailey | 152/221 |
| 1,581,722 | 4/1926 | Del Valle | 152/240 |
| 1,583,065 | 6/1926 | Thomsen | 152/232 |
| 1,644,077 | 10/1927 | Nesbitt | 152/222 |
| 1,829,859 | 11/1931 | Helgeson | 152/240 |
| 2,061,870 | 11/1936 | Gould | 152/240 X |
| 2,528,203 | 10/1950 | Zwosta | 152/233 |
| 2,714,914 | 8/1955 | Champigny | 152/222 |
| 3,316,979 | 5/1967 | Dedoes | 152/239 X |
| 4,155,389 | 5/1979 | Dwinell | 152/221 |

FOREIGN PATENT DOCUMENTS 1001615 1/1957 Fed. Rep. of Germany .......... 152/222

*Primary Examiner*—William A. Powell
*Assistant Examiner*—Robert A. Dawson
*Attorney, Agent, or Firm*—Shapiro and Shapiro

[57] ABSTRACT

A cable type tire chain has traction sleeves on the cross members located only adjacent to the shoulders of the tire. The center portion of the cross members adjacent to the middle of the tire tread is free of traction sleeves. The traction sleeves are spaced away from the middle of the tire tread by either a coil spring through which the cross member cable extends or by beads attached to the cable. The cross members are attached directly to the side members of the tire chain by flat profile hooks formed from rectangular strips of metal, so that the cross members lie close to the sidewalls of the tire. The invention provides improved traction and reduced wear of both the tire and the tire chain.

17 Claims, 4 Drawing Figures

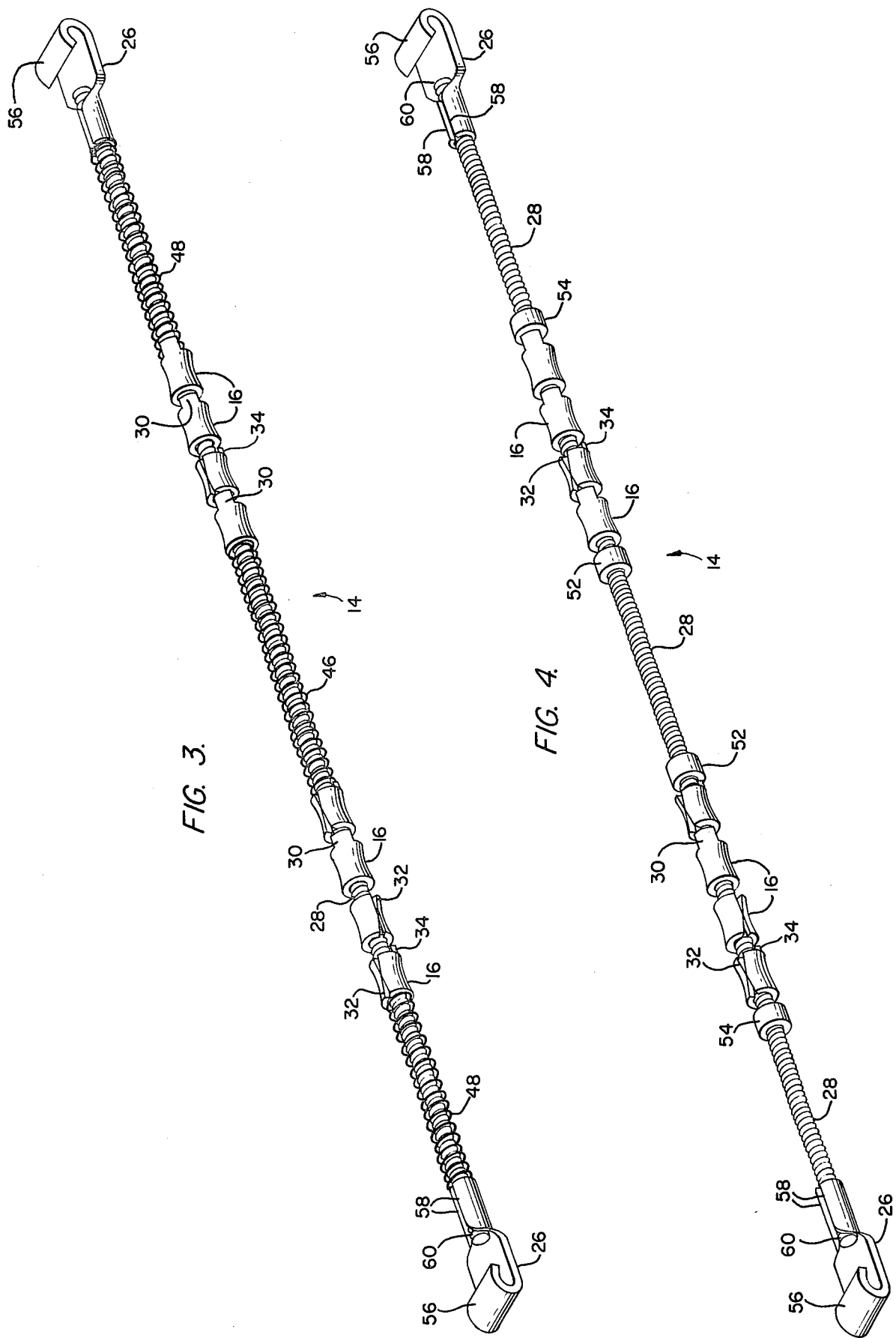

TIRE CHAIN HAVING IMPROVED TRACTION

BACKGROUND OF THE INVENTION

This invention relates generally to improvements in tire chains, and more particularly to improvements in tire chains having cable cross members extending through traction sleeves.

Tire chains of either the link type or the cable type are well known. Both types are subject to wear, particularly when driven on dry roads or at high speeds, and both types tend to increase tire wear. Furthermore, many tire chains cannot be used on vehicles having limited clearance between the tire and the vehicle body. A need exists for a tire chain which overcomes these disadvantages and which has improved traction capability. It is to this end that the present invention is directed.

SUMMARY OF THE INVENTION

Accordingly, it is an object of the invention to provide a new and improved tire chain having improved traction and which affords less wear of both the tire and the chain.

Another object is to provide a tire chain capable of being used on vehicles with limited clearance between the tires and the vehicle body.

Briefly stated, a tire chain in accordance with the invention employs a cross member having a flexible member which extends across the tread of a tire and connects to side members disposed generally circumferentially at opposite sides of the tire, the flexible member having traction means located thereon at regions adjacent to the shoulders of the tire, and the portion of the flexible member adjacent to the middle of the tire tread being free of traction means.

In accordance with another aspect of the invention, the cross member employs a cable adapted to extend across the tire tread between the side members of the tire chain, the cable having a hook on each end, each hook formed from a rectangular strip of metal with one end portion curled for connection directly to a side member and an opposite end portion formed into a cylinder for receiving and gripping an end of the cable.

BRIEF DESCRIPTION OF THE DRAWINGS

FIGS. 3 and 4 are similar perspective views of two embodiments of the cross member.

DESCRIPTION OF THE PREFERRED EMBODIMENTS

Figure 1:
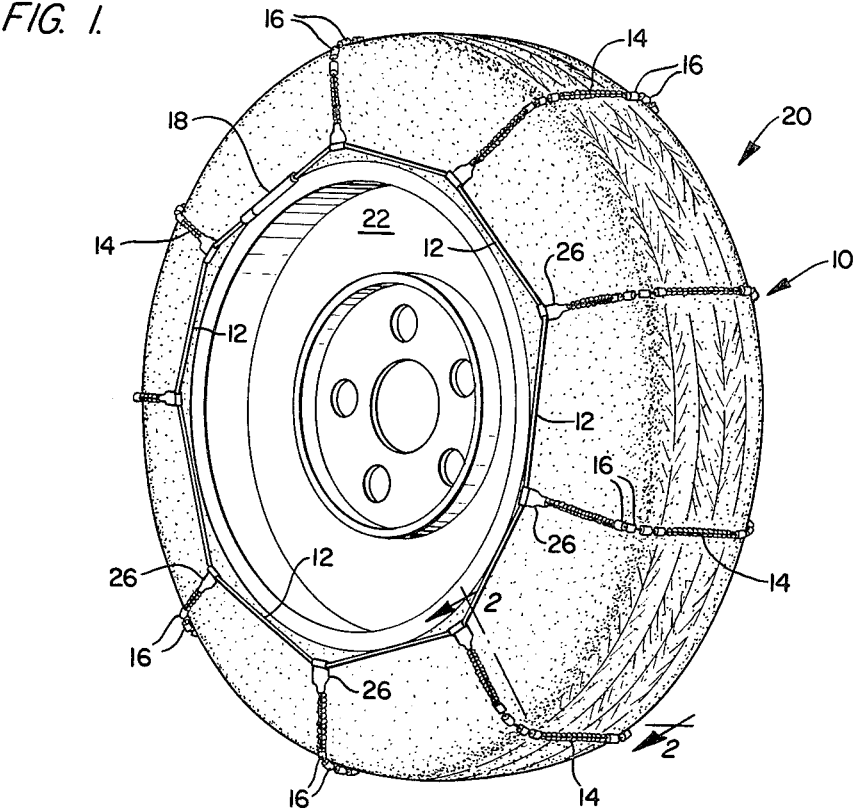
FIG. 1 is a perspective view of a tire chain in accordance with the invention shown applied to a vehicle tire.

Referring to FIG. 1, the present invention is preferably employed in a full cable type of tire chain 10 having side members 12 and cross members 14 comprising cable, such as stranded steel aircraft cable. The cross members include a plurality of traction members or sleeves 16. The side members may also be formed of other types of elongated flexible material. At least one of the side members includes a fastener 18 to permit the tire chain 10 to be applied to a tire 20 mounted on a vehicle wheel 22. The cross members also include hooks 26, to be described more fully later, for connecting the cross members directly to the side members.

Figure 2:
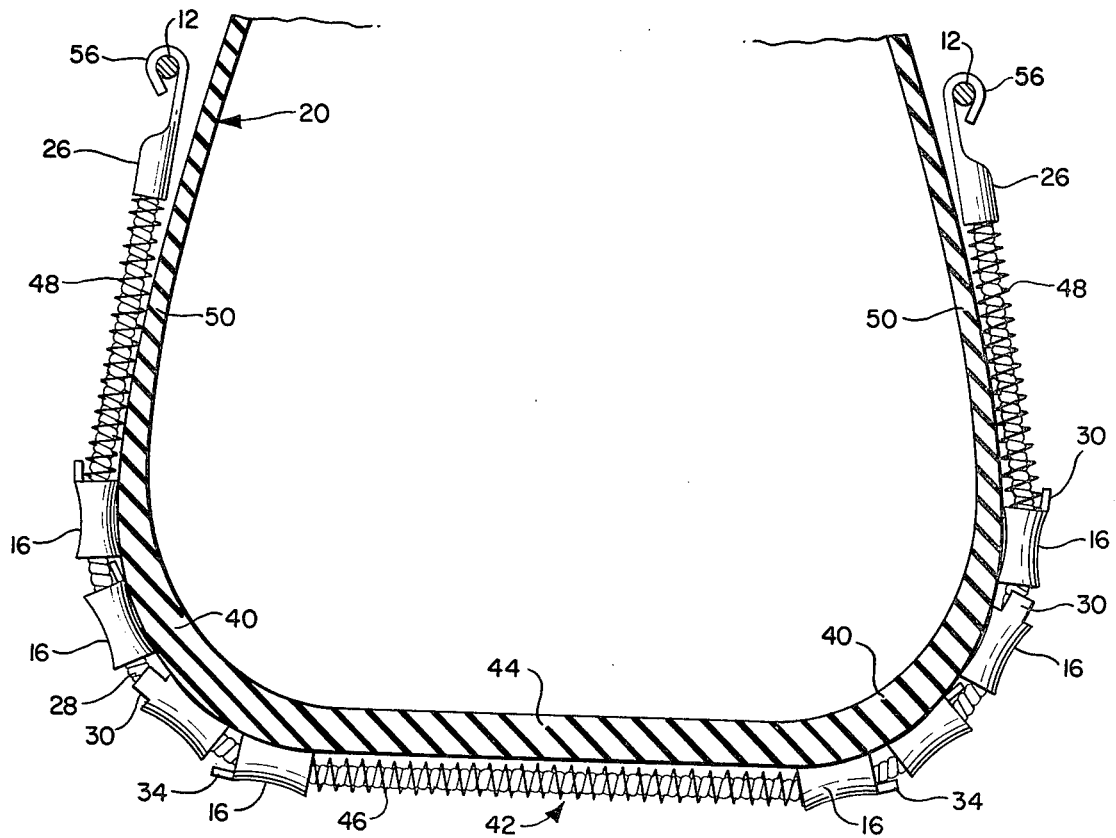
FIG. 2 is an enlarged cross sectional view taken approximately in the plane of line 2—2 of FIG. 1.

Referring particularly to FIGS. 2 and 3, each cross member includes a cable 28 which supports a plurality of traction sleeves 16. Preferably, the traction sleeves are the type disclosed in U.S. Pat. No. 4,155,389, to Dwinell, issued May 22, 1979, formed by bending a generally rectangular strip of metal into a cylindrical shape, and having spacer tabs 30 for spacing adjacent sleeves apart and exposed, sharp biting edges 32, 34. Significantly, traction sleeves are only provided on portions of the cross member which are adjacent to the shoulders 40 of the tire, as clearly illustrated in FIG. 2. The portion 42 of the cross member adjacent to the middle 44 of the tire tread is free of traction sleeves.

In order to position the traction sleeves on the cross member cable 28 at regions adjacent to the tire shoulders and prevent them from moving to portions of the cable adjacent to the middle of the tire tread, a coil spring 46 may be located on cable 28 at the middle portion of the cross member adjacent to the middle of the tread, as shown in FIGS. 2 and 3. Similar coil springs 48 may be provided on the cross member cable adjacent to the tire sidewalls 50 to prevent the traction members from riding too high on the sidewall.

FIG. 4 illustrates another embodiment of the cross member. Instead of a coil spring, a pair of stops 52 secured to cable 28 may be employed as spacers to hold the traction sleeves on the tire shoulders. Stops 52 may be steel beads which are crimped, welded, or otherwise attached to the cable 28. Similar stops 54 may likewise be attached to the cable between the hooks 26 and the traction sleeves 16 to space the traction sleeves away from the hooks and confine them to the proper locations on the cross member cable.

In the preferred forms of the invention illustrated, the hooks 26 on each end of the cross members 14 connect the cross members directly to the side members 12. Preferably, the hooks are formed from a generally rectangular strip of metal, such as steel. One end portion 56 of the metal strip is curled about a first axis to form a hook portion which may be crimped or otherwise attached to the side members (FIG. 2). The sides 58 of the end portion of the metal strip opposite the curled end 56 may be bent together about a second axis perpendicular to the first axis to form a cylindrical portion for receiving and gripping the end 60 of the cable 28. The hooks may be attached to the cable ends as by crimping, swedging, or welding, for example.

Hooks formed in this manner have a flat profile, as illustrated in FIG. 2. This allows the cross members to ride close to the sidewall of the tire, and permits the tire chain to be used on vehicles having limited clearance between the tires and the vehicle body. Because the hooks of the invention may be relatively small in size in comparison with the eye hooks formed from circular rod which are used on many tire chains, and because the hooks of the invention are connected directly to the side members, the weight of the tire chain can be reduced. This reduces wear of both the tire and the chain, as will be explained, as well as the manufacturing costs of the chain.

Several other important advantages and improved results flow from the foregoing preferred embodiments of the invention. First, it has been found that by eliminating the traction sleeves from the middle of the tire tread and confining them only to the shoulders, a significant increase in traction results. This is believed to be due to the fact that the majority of the tractive force of the tire comes from its shoulders; the tread in the middle portion of the tire serves principally as a connecting device to connect the two shoulders. In a properly inflated and weighted tire, the center of the tread is actually slightly concave and barely touches the road. Accordingly, traction sleeves in this portion of the tire are much less effective than traction sleeves on the shoulders.

Second, wear of both the tire and its tire chain is reduced. Since traction sleeves are eliminated from the middle portion of the cross members, tire tread wear is reduced. Furthermore, eliminating traction sleeves from the center portion of the cross members reduces the mass of the cross member at its center portion. As the tire rotates, centrifugal force lifts the middle portion of the cross member the farthest distance from the tire, accelerates it to the fastest speed, and forces it into the road with the greatest impact. By reducing the mass of the cross members at their center portions, centrifugal force, and hence the impact force imparted to the cross members, is reduced. Accordingly, wear on the cross members is reduced. Similarly, as previously described, hooks 26 connecting cross members 14 directly to the side members also reduce the weight of the tire chain. This further reduces wear of the tire and the chain. Since the tire chain is lighter, there is less centrifugal force pulling the cross members outwardly from the middle of the tire tread. The hooks, therefore, tend to ride higher on the tire sidewalls and keep the traction sleeves adjacent to the shoulders and away from the middle of the tire tread.

Additionally, coil spring 46 being made of resilient material, reduces the wear on the middle portion 42 of the cross member cable 28, thus increasing the life of the tire chain.

While preferred embodiments have been shown and described, it will be apparent to those skilled in the art that changes may be made in these embodiments without departing from the principles and spirit of the invention, the scope of which is defined by the appended claims. 9n

What is claimed is:

1. A cross member for a tire chain of the type having cross members connected to a pair of side members adapted to be disposed generally circumferentially on opposite sides of a tire, comprising a cable adapted to extend between the side members across the tread of the tire and having connecting means on its opposite ends for connection to the side members, and traction means comprising a plurality of sleeves through which the cable extends the traction means being disposed on and held on the cable only at locations thereon adjacent to the shoulders of the tire, the portion of the cable adjacent to the middle of the tire tread being free of such traction means.

2. The cross member of claim 1, wherein the sleeves have exposed sharp edges and have a tab adjacent to one end thereof for spacing adjacent sleeves apart.

3. The cross member of claim 1, wherein first spacer means holds the sleeves on the cable away from said portion of the cable adjacent to the middle of the tire tread.

4. The cross member of claim 3, wherein the first spacer means comprises spring means through which the cable extends.

5. The cross member of claim 3, wherein the first spacer means comprises a pair of stops attached to the cable.

6. The cross member of claim 3, further comprising second spacer means for holding the sleeves away from the connecting means.

7. The cross member of claim 6, wherein the second spacer means comprises spring means located on the cable between the connecting means and the sleeves.

8. The cross member of claim 6, wherein the second spacer means comprises a pair of stops attached to the cable between the connecting means and the sleeves.

9. The cross member of claim 1, wherein the connecting means comprises means for connecting the cross members directly to the side member.

10. The cross member of claim 9, wherein the connecting means comprises a hook on each end of the cable, each hook formed from a rectangular strip of metal having one end portion curled for connection to a side member and an opposite end portion formed into a cylinder for receiving and gripping an end of the cable.

11. A cross member for a tire chain of the type having cross members connected to a pair of side members adapted to be disposed generally circumferentially on opposite sides of a tire, comprising a cable adapted to extend between the side members across the tread of the tire, traction means comprising a plurality of sleeves through which the cable extends, the traction means being disposed on the cable only at locations thereon adjacent to the shoulders of the tire, and a hook on each end of the cable, each hook formed from a rectangular strip of metal having one end portion curled for connection to a side member and an opposite end portion formed into a cylinder for receiving and gripping an end of the cable.

12. A tire chain comprising a pair of side members adapted to be disposed on opposite sides of a tire, a plurality of spaced cross members connected to the side members such that they extend across the tire tread, each cross member comprising a cable extending through a plurality of sleeves and including means for holding the sleeves on the cable only at locations adjacent to the tire shoulders, the portion of the cable adjacent to the middle of the tire tread being free of such sleeves.

13. The tire chain of claim 12, wherein the holding means comprises first and second spring means, the first spring means spacing the sleeves away from the portions of the cross members adjacent to the middle of the tire tread, and the second spring means spacing the sleeves away from the side members.

14. The tire chain of claim 12, wherein the holding means comprises first and second stop means attached to the cable, the first stop means spacing the sleeves away from the portions of the cross member adjacent to the middle of the tire tread, and the second stop means spacing the sleeves away from the side members.

15. A cross member for a tire chain of the type having cross members connected to a pair of side members adapted to be disposed generally circumferentially on opposite sides of a tire, comprising a flexible member adapted to extend between the side members across the tread of the tire, connecting means for connecting the flexible member directly to the side members, the connecting means comprising a hook on each end of the flexible member, each hook formed from a rectangular strip of metal having one end portion curled for connection to a side member and an opposite end portion formed into a cylinder for receiving and gripping an end of the flexible member, and traction means disposed on the flexible member at locations thereon adjacent to the shoulders of the tire, the portion of the flexible member adjacent to the middle of the tire tread being free of such traction means.

16. A tire chain comprising a pair of side members adapted to be disposed on opposite sides of a tire, a plurality of spaced cross members connected to the side members such that they extend across the tire tread, each cross member comprising a flexible member extending through a plurality of traction members and including means for holding the traction members on the flexible member at locations adjacent to the tire shoulders, the portion of the flexible member adjacent to the middle of the tire tread being free of such traction members, the holding means including first and second spring means, the first spring means spacing the traction members away from the portion of the cross member adjacent to the middle of the tire tread, and the second spring means spacing the traction members away from the side members.

17. A tire chain comprising a pair of side members adapted to be disposed on opposite sides of a tire, a plurality of spaced cross members connected to the side members such that they extend across the tire tread, each cross member comprising a flexible member extending through a plurality of traction members and including means for holding the traction members on the flexible member at locations adjacent to the tire shoulders, the portion of the flexible member adjacent to the middle of the tire tread being free of such traction members, the holding means including first and second stop means attached to the flexible member, the first stop means spacing the traction members away from the portion of the cross member adjacent to the middle of the tire tread, and the second stop means spacing the traction members away from the side members.

* * * * *